No. 863,819. PATENTED AUG. 20, 1907.
E. C. WILLIAMS.
VISE.
APPLICATION FILED JAN. 2, 1906.
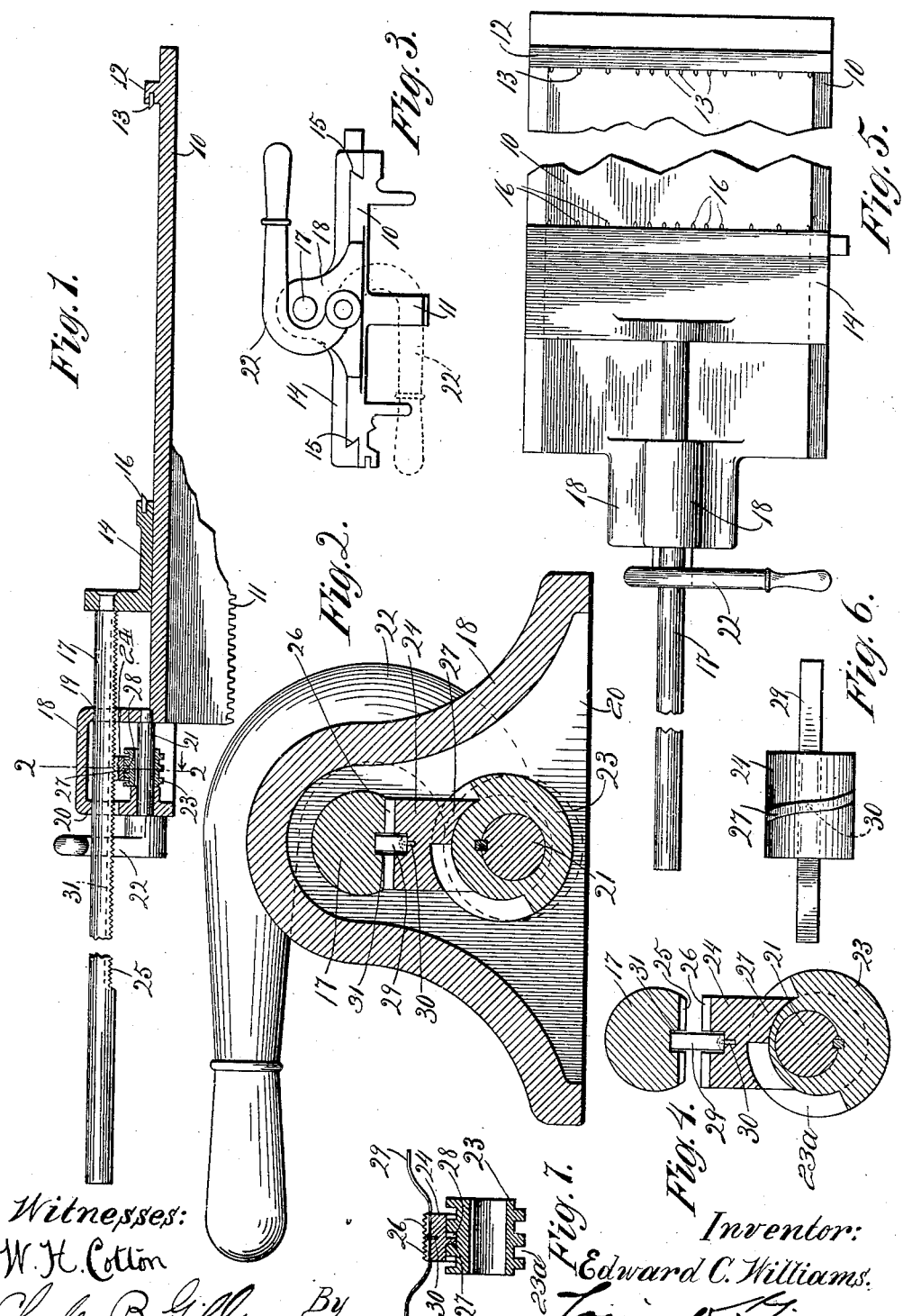
Witnesses:
W. H. Cotton
Charles B. Gillson
Inventor:
Edward C. Williams.
By
Atty.

UNITED STATES PATENT OFFICE.

EDWARD C. WILLIAMS, OF BOSTON, MASSACHUSETTS, ASSIGNOR TO UNITED PRINTING MACHINERY CO., A CORPORATION OF MAINE.

VISE.

No. 863,819.    Specification of Letters Patent.    Patented Aug. 20, 1907.

Original application filed May 27, 1905, Serial No. 262,584. Divided and this application filed January 2, 1906.
Serial No. 294,276.

*To all whom it may concern:*

Be it known that I, EDWARD C. WILLIAMS, a citizen of the United States, and a resident of Boston, county of Suffolk, and State of Massachusetts, have invented certain new and useful Improvements in Vises, of which the following is a specification, and which are illustrated in the accompanying drawings, forming a part thereof.

This application is a division of my pending application for Letters Patent Serial No. 262,584, filed May 27, 1905, subject: Type high planers. The invention relates to a work-holding vise of that type in which there is provided two relatively movable clamping jaws and mechanism for causing the jaws to approach each other with great power.

More particularly, the invention relates to such a vise in which the operating mechanism is so constructed that it may be readily thrown out of action and the parts quickly adjusted for receiving work of various sizes by manually shifting the jaws. In vises of this kind as heretofore constructed, only a small amount of movement can be given to the clamping jaws by the operating mechanism, so that if the jaws are provided with impaling teeth, or the material to be clamped may be easily compressed, a rigid hold cannot be obtained.

The object of the invention is, therefore, to provide a vise of simple and durable construction, in which the operating mechanism is so designed that it may be employed for moving the jaws with great power through a wide range, thus rendering the device effective for obtaining a firm hold upon work which yields to or is compressed by the clamping force.

The invention consists in the construction and arrangement of parts to be hereinafter described and claimed, and which is illustrated in the accompanying drawings, in which—

Figure 1 is a central longitudinal section of a vise constructed according to the invention; Fig. 2 is a transverse section as viewed from the line 2—2 of Fig. 1; Fig. 3 is an end view of the device; Fig. 4 is a sectional view, similar to Fig. 2, showing the parts of the operating mechanism in a different position, some of the parts of the vise being omitted; Fig. 5 is a plan view of the device; Fig. 6 is an inverted plan view of a detail of the construction separated from other parts; and Fig. 7 is a sectional detail showing some of the parts of Fig. 1 drawn to a larger scale.

As shown in the drawings, the parts have been so constructed as to adapt them for securing the work to the table 10 of a planing machine, a gear-rack 11 being formed along the median line of the table and coöperating with suitable gears, not shown, of the planing machine for advancing the table. When constructed in this manner the fixed jaw of the vise takes the form of a shoulder 12, mounted transversely on the table 10 adjacent its forward end and preferably provided with rearwardly extending work-engaging teeth 13. The movable jaw of the vise is shown at 14, and has preferably a dove-tailed engagement, 15, with the table 10, so as to slide freely over its surface. As shown, forwardly directed work-engaging teeth 16 are carried by the movable jaw 14 and coöperate with the teeth 13 for securing the work to the table.

A rod 17 of considerable length is centrally mounted in the movable jaw 14 and extends rearwardly therefrom through a housing or casing 18, the walls 19, 20, of which are formed integral with the table 10, so as to be fixed in position relatively to the jaw 12.

A cam 23, adapted to intermittently engage the rod 17 to advance the movable jaw 14, has a bearing in the casing 18. As shown, this cam takes the form of a worm eccentrically mounted on a rod 21 journaled in the walls of the casing and provided with a crank handle 22. Preferably the cam 23 engages the rod 17 through the medium of a cam-block 24, which rides on the cam and has formed upon its upper face a plurality of transverse teeth 26, which coöperate with a similar series of teeth 25 formed on the under side of the rod 17 for substantially its entire length. A boss 27, cut diagonally on the cam-block 24 to correspond with the pitch of the worm, runs in the groove 23$^a$ of the cam and is preferably of less width than this groove so as to provide a clearance or back lash 28 between the walls of the groove and the boss, equal in width to one or more of the teeth 25, 26. It will be readily understood, therefore, that by turning the rod 21, the cam-block 24 may be longitudinally reciprocated and raised and lowered into and out of engagement with the rod 17. To insure this latter movement being effected with certainty, a leaf spring 29, Fig. 7, is secured to the cam block 24 by means of a pin 30, and runs in a suitable longitudinal groove 31 formed in the under face of the rod 17.

The operation of the device is as follows:—The work to be secured by the clamping jaws is placed upon the table 10, preferably with one of its edges bearing against the teeth 13 of the fixed jaw 12. The operating handle 22 is then thrown to the position indicated by dotted lines in Fig. 3, the cam 23 being then in the position shown in Fig. 4, and the cam block 24 out of engagement with the rod 17, so that the latter is free to slide. The movable jaw 14 is then grasped by the hand and advanced upon the table until the teeth 16 come into engagement with the work to be clamped. By rotating the cam shaft 21 to the right, as viewed in Fig. 3, the cam-block 24 will be raised and advanced. The raising of the cam-block brings it into engagement with the rod 17, which then advances with the block and the movable jaw of the vise is forced upon the work with great power.

When the cam shaft 21 has been turned to the limit of its movement, it may be turned in the opposite direction without retracting the movable jaw of the vise, for the eccentricity of the worm shaft 23 is such that the cam-block 24 will be lowered out of engagement with the rod 17 before the back lash or clearance 28 between the boss 27 of the cam block and the retracting face of the cam-groove has been taken up. If then, after the cam shaft 21 has been turned to the limit of its reverse movement, it is again rotated to advance the cam block, the latter will be raised into contact with the rod 17, before the clearance or back lash 28, which will now be at the advancing side of the cam groove 23ª, has been taken up and the teeth 26 of the cam-block will engage the teeth 25 of the rod a short distance back of the position in which they were engaged during the previous advance, and a further movement may be given to the clamping jaws. In this way the movable jaw of the vise may be advanced by short steps with great power through as great a distance as may be required, and a firm hold may be taken upon work, even though it may be of a soft or yielding nature.

Obviously the device might be constructed in other forms than that shown in the drawings without departing from the invention, the mechanism just described being equally adapted to the ordinary bench or mechanic's vise.

I claim as my invention—

1. The combination with a movable clamping member, of a cam block coöperating therewith, a cam for longitudinally reciprocating the cam-block, and a lifting cam for moving the cam-block into and out of engagement with the clamping member, the lifting cam being adapted to operate in both directions in advance of the first-named cam.

2. The combination with a movable clamping member having rack teeth, of an oscillatable cam having a groove, the walls of the groove being oblique to the direction of movement of the clamping member, a cam-block having teeth complementary in form with the rack teeth of the clamping member riding on the cam and shiftable thereby into and out of engagement with the clamping member, and a boss formed on the cam-block reaching into the groove of the cam, the thickness of the boss being less than the width of the groove by an amount equal to the width of one of the rack teeth whereby the walls of the cam groove when reversed do not come into engagement with the boss until after the cam-block has been shifted by the cam.

3. In a vise, in combination, two relatively movable clamping jaws, a cam-block for engaging one of the jaws and having a boss, a journal-bearing fixed as to the other jaw, and an eccentric worm turning in the bearing and engaging the boss, the worm being fixed against longitudinal movement in the bearing and the width of the groove in the worm being greater than the thickness of the boss.

4. In a vise, in combination, two relatively movable clamping jaws, a cam-block having toothed engagement with one of the jaws and having a boss, a journal-bearing fixed as to the other jaw, an eccentric worm turning in the bearing and engaging the boss, the width of the groove of the worm being greater than the thickness of the boss by an amount equal to the width of one of the teeth on the cam-block.

EDWARD C. WILLIAMS.

Witnesses:
R. S. BARROWS,
I. M. KENT,
ROBERT T. FOWLER.